US011539896B2

(12) United States Patent
Krishnappa et al.

(10) Patent No.: US 11,539,896 B2
(45) Date of Patent: Dec. 27, 2022

(54) METHOD AND APPARATUS FOR DYNAMIC IMAGE CAPTURING BASED ON MOTION INFORMATION IN IMAGE

(71) Applicant: Samsung Electronics Co., Ltd., Suwon-si (KR)

(72) Inventors: Pradeep Kumar Sindhagatta Krishnappa, Bengaluru (IN); Pranav Prakash Deshpande, Bengaluru (IN); Karthik Srinivasan, Bangalore (IN); Saikat Kumar Das, West Bengal (IN); Alok Shankarlal Shukla, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 420 days.

(21) Appl. No.: 16/664,750

(22) Filed: Oct. 25, 2019

(65) Prior Publication Data

US 2020/0137287 A1 Apr. 30, 2020

(30) Foreign Application Priority Data

Oct. 25, 2018 (IN) .............................. 201841040316
Jul. 16, 2019 (IN) .............................. 201841040316
Oct. 23, 2019 (KR) ........................ 10-2019-0132391

(51) Int. Cl.
*H04N 5/235* (2006.01)
*H04N 9/04* (2006.01)
(Continued)

(52) U.S. Cl.
CPC .............. *H04N 5/2353* (2013.01); *G06T 7/13* (2017.01); *G06T 7/20* (2013.01); *H04N 5/2351* (2013.01);
(Continued)

(58) Field of Classification Search
CPC .. H04N 5/2353; H04N 5/2351; H04N 5/2355; H04N 9/0451; H04N 5/23254;
(Continued)

(56) References Cited

U.S. PATENT DOCUMENTS 8,823,813 B2 9/2014 Mantzel et al.
10,630,869 B1 * 4/2020 Forsythe ................. G06T 7/254
(Continued)

FOREIGN PATENT DOCUMENTS

JP 2016-019060 A 2/2016
KR 10-1376936 B1 3/2014

OTHER PUBLICATIONS

Notification of Transmittal of the International Search Report and the Written Opinion of the International Searching Authority, or the Declaration dated Feb. 5, 2020 in connection with International Patent Application No. PCT/KR2019/014213, 10 pages.
(Continued)

*Primary Examiner* — Luong T Nguyen

(57) ABSTRACT

A method and an apparatus for capturing a high quality dynamic image by setting a different row-wise exposure value when capturing a scene are provided. The dynamic image capturing method includes: generating an image by pre-capturing a scene via an event sensor; generating event data from the image; determining a row-wise exposure value of the image based on the event data; and determining a row-wise readout priority order of the image based on the row-wise exposure value of the image.

15 Claims, 14 Drawing Sheets

(51) Int. Cl.
*G06T 7/13* (2017.01)
*G06T 7/20* (2017.01)

(52) U.S. Cl.
CPC ......... *H04N 5/2355* (2013.01); *H04N 9/0451* (2018.08); *G06T 2207/10024* (2013.01)

(58) Field of Classification Search
CPC ........... H04N 5/3535; G06T 7/13; G06T 7/20; G06T 2207/10024; G06T 7/246
See application file for complete search history.

(56) References Cited

U.S. PATENT DOCUMENTS

| | | |
|---|---|---|
| 2012/0257789 A1 | 10/2012 | Lee et al. |
| 2012/0314124 A1* | 12/2012 | Kaizu ................. H04N 5/2353 348/E5.037 |
| 2013/0044241 A1 | 2/2013 | Zhou |
| 2014/0368712 A1 | 12/2014 | Park et al. |
| 2015/0341576 A1 | 11/2015 | Gu et al. |
| 2017/0310866 A1 | 10/2017 | Zhou et al. |
| 2020/0029020 A1* | 1/2020 | Morales ............... H04N 5/3535 |

OTHER PUBLICATIONS

Supplementary European Search Report dated Sep. 17, 2021, in connection with European Application No. 19875538.1, 13 pages.

* cited by examiner

METHOD AND APPARATUS FOR DYNAMIC IMAGE CAPTURING BASED ON MOTION INFORMATION IN IMAGE

CROSS-REFERENCE TO RELATED APPLICATIONS

This application is related to and claims the benefit of Korean Patent Application No. 10-2019-0132391 filed on Oct. 23, 2019 in the Korean Intellectual Property Office, Indian Patent Application No. 201841040316 filed on Oct. 25, 2018, and Indian Patent Application No. 201841040316 filed on Jul. 16, 2019 in the Indian Intellectual Property Office, the disclosures of which are herein incorporated by reference in their entireties.

BACKGROUND

1. Field

The disclosure relates to an image capturing method and an image capturing apparatus, the method and the apparatus using an event-based rolling shutter sensor for capturing a high dynamic range image or a scene including many motions.

2. Description of Related Art

It takes long time and great expenses to capture and process a high dynamic range (HDR) image or video. A current HDR processing method represents a high speed motion by fusing and processing a plurality of images. However, this image fusing method increases the amount of calculations and skews of an object may occur in an image.

SUMMARY

Provided are an image capturing method and an image capturing apparatus for accurately representing motions when capturing high dynamic range (HDR) images and videos.

Additional aspects will be set forth in part in the description which follows and, in part, will be apparent from the description, or may be learned by practice of the presented embodiments of the disclosure.

According to an embodiment of the disclosure, a dynamic image capturing method includes: generating an image by pre-capturing a scene via an event sensor; generating event data from the image; determining a row-wise exposure value of the image based on the event data; and determining a row-wise readout priority order of the image based on the row-wise exposure value of the image.

The method may further include obtaining RGB data by capturing the image based on the row-wise readout priority order of the image.

The method may further include generating row-wise motion information of the scene based on the event data The determining of the row-wise readout priority order of the image may include assigning a high priority order to a row having a high motion degree, based on the row-wise motion information.

The determining of the row-wise exposure value of the image may include determining the row-wise exposure value of the image by determining a row-wise brightness intensity of the image. The generating of the event data from the image may include generating the event data by extracting a change in an edge of an object in the image.

The event data may include an asynchronous change of an intensity of a pixel included in the image.

The row-wise exposure value may be generated based on a row-wise exposure time of the scene.

The method may further include assigning a relatively less exposure time to a row of the image, the row having a relatively high brightness intensity, and assigning a relatively more exposure time to a row of the image, the row having a relatively low brightness intensity.

The method may further include determining redundancy information of the image based on the event data and event data obtained from a previous RGB frame, and the determining of the row-wise readout priority order of the image may include determining the row-wise readout priority order of the image by using the redundancy information.

According to another embodiment of the disclosure, an exposure time control method for dynamic image capturing includes: determining a row-wise change in brightness level of an image generated by pre-capturing a scene; determining a row-wise exposure time of the image when capturing the scene via an RGB sensor, proportionately to a row-wise brightness level of the image; determining a row from among rows, the row having a motion of an object in the image; assigning a row-wise high readout priority order to the row having the motion of the object in the image; and determining a readout time according to the assigned row-wise high priority order.

The determining of the row-wise change in the brightness level may include determining the row-wise change in the brightness level by changing a critical value of a sensing degree of an event sensor capturing the motion of the object.

The method may further include generating an RGB frame according to the determined readout time.

According to another embodiment of the disclosure, a dynamic image capturing apparatus includes: an event sensor configured to pre-capture a scene; and a processor configured to: generate event data from image pre-captured by the event sensor; and determine a row-wise exposure value of the image based on the event data and determine a row-wise readout priority order of the image based on the row-wise exposure value of the image.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
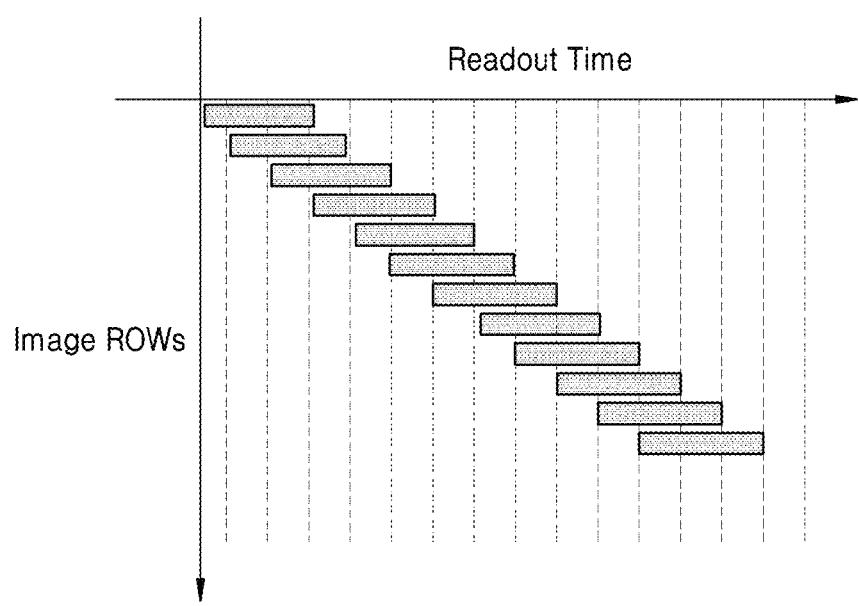
FIG. 1 shows a readout time of each of rows of an image, when a complementary metal-oxide-semiconductor (CMOS) rolling shutter image sensor is implemented.

FIGS. 1 through 10C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms used in this specification will be briefly described and the disclosure will be described in detail.

The terms used in the disclosure are selected from among common terms that are currently widely used in consideration of their function in the disclosure. However, the terms may be different according to an intention of one of ordinary skill in the art, a precedent, or the advent of new technology. Also, in some embodiments, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

Throughout the specification, when a part "includes" an element, it is to be understood that the part additionally includes other elements rather than excluding other elements as long as there is no particular opposing recitation. Also, the terms such as " . . . unit," "module," or the like used in the specification indicate an unit, which processes at least one function or motion, and the unit may be implemented by hardware or software, or by a combination of hardware and software.

Hereinafter, the disclosure will now be described more fully with reference to the accompanying drawings for one of ordinary skill in the art to be able to perform the disclosure without any difficulty. The disclosure may, however, be embodied in many different forms and should not be construed as being limited to the embodiments set forth herein. Also, parts in the drawings unrelated to the detailed description are omitted to ensure clarity of the disclosure. Like reference numerals in the drawings denote like elements.

Artificial intelligence (AI)-related functions according to the disclosure may be operated by processors and memories. A processor may correspond to a single processor or a plurality of processors. Here, the single processor or the plurality of processors may include general-purpose processors, such as a central processing unit (CPU), an application processor (AP), a digital signal processor (DSP), etc., graphic-exclusive processors, such as a graphics processing unit (GPU), a vision processing unit (VPU), etc., or AI-exclusive processors, such a neural processing unit (NPU), etc. The single processor or the plurality of processors may control data, which is input, to be processed based on pre-defined operating rules or AI models stored in memories. Alternatively, when the single process or the plurality of processors correspond to the AI-exclusive processor, the AI-exclusive processor may be designed as a hardware structure specialized for processing a specific AI model.

Throughout the disclosure, the terms "row" and "column" are relative concepts, wherein, according to a direction in which a camera captures an image, the "row" may become the "column" or the "column" may become the "row." Thus, in the disclosure, when a "row" is described, the "row" may also indicate a "column" in an image.

A complementary metal-oxide semiconductor (CMOS) image sensor may be used to capture and process an image. A maximum frame rate to be achieved by the CMOS image sensor may be determined based on a maximum data bandwidth of a column multiplexer or an output amplifier.

The frame rate that is a speed of capturing an image may depend on a signal sampling time at an amplifier and a pixel array. However, with an increased pixel access time due to increased resolution and a widened focal area, a frame rate of the CMOS image sensor at a given resolution is more and more restricted.

The CMOS image sensor of a camera device may have to implement a de-blurring method, which takes great expenses, in order to compensate for "motion artifacts" generated when capturing moving objects. Also, when the frame rate is increased, exposure time may be decreased and a "light-starved" phenomenon may occur in an image, which results in a decrease of sensitivity of the image sensor. The CMOS image sensor may not support automatic exposure conversion in real time. Also, the CMOS image sensor may have a significant delay during conversion to automatic capturing and automatic exposure. When a camera device has the combination of a high frame rate, a low image sensing degree (sensitivity), and a great delay, a high speed image or a video may inevitably have a low image quality.

In a readout phase of an image, the CMOS image sensor may consume power of the camera device. Most power consumption of the CMOS image sensor may be associated with voltage sampling and analog-to-digital conversion. In a CMOS image sensor having high power consumption, the image readout phase may cause temporal bottlenecks in image capturing.

A camera device implementing a rolling shutter is an architecture adopted to overcome the restriction of a fixed bandwidth of a CMOS image sensor and to achieve a high frame rate. According to the rolling shutter method, an image sensor is configured to capture an image for each row, rather than capturing the image at once. A method of capturing a total image at once is referred to as a global shutter method. Thus, according to the rolling shutter method, because not all portions of an image are instantly captured, when a scene includes an object moving at high speed, the quality of an image may be worse than the quality of an image captured by using the global shutter method.

The rolling shutter method may enable flexible sampling of three-dimensional space-time values in a scene and sub-image capturing for effectively encoding operations and dynamic range information in a single image. However, according to a current rolling shutter method, a row (or column) exposure value may not be dynamically determined, and thus, it may take lots of time to perform a readout operation for capturing an image and an image capturing operation.

Throughout the specification, the terms "scene" and "image" may be interchangeably used. According to an embodiment of the disclosure, a result generated by capturing a scene will be referred to as an image. It is generally desirable to understand an image as scene data obtained by capturing a scene.

FIG. 1 shows a row-wise readout time of an image, when a CMOS rolling shutter image sensor is implemented.

With reference to FIG. 1, the row-wise readout time in the image is constant. That is, the same readout time is assigned to each of regions in a scene, regardless of a brightness of each region. In some embodiments, a readout pattern may be generated only by analyzing a scene without processing an input image.

Figure 2A:
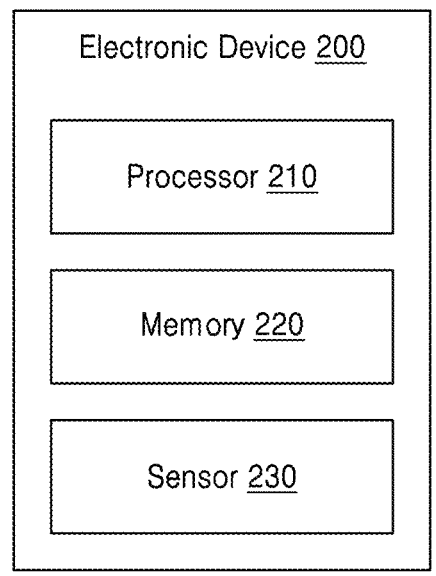
FIG. 2A illustrates a block diagram of an electronic device 200 according to an embodiment of the disclosure.

FIG. 2A is a block diagram of an electronic device 200 according to an embodiment of the disclosure.

The electronic device 200 may include a processor 210, a memory 220, and a sensor 230.

The processor 210 may be connected to the memory 220 and may control executable instructions stored in the memory 220. The memory 220 may include a non-volatile storage medium. The non-volatile storage medium may include any one of a magnetic hard disk, an optical disk, a floppy disk, a flash memory, an erasable programmable read-only memory (EPROM), or an electrically EPROM (EEPROM).

According to an embodiment of the disclosure, the memory 220 may include a non-transitory storage medium. Here, the term "non-transitory" denotes that the storage medium is not realized as a signal including carrier waves or radio waves. According to an embodiment of the disclosure, the memory 220 may include a storage medium, such as random-access memory (RAM) or cache, which is capable of storing data changeable according to time.

According to an embodiment of the disclosure, the sensor 230 may include a monocular sensor. The sensor 230 may include a red, green, blue (RGB) circuit (or an RGB sensor) for capturing RGB data (or an RGB frame) of a scene, and an event circuit (or an event sensor) for capturing event data of the scene. The event data of the scene may include a change in pixel intensity in an image, which is obtained by capturing the scene. Here, the change in pixel intensity may be an asynchronous change.

The "asynchronous change" may mean the change in pixel intensity may not be synchronized with capturing of the RGB frames.

The processor 210 may obtain, from the sensor 230, scene data generated by capturing the scene. The scene data may include the RGB data of the scene captured by using the RGB circuit and the event data of the scene captured by using the event circuit. The event data may correspond to data containing object motion information and/or pixel intensity change information in the scene without color information. The RGB data may correspond to information mainly including color information of the scene.

The processor 210 may determine a row-wise exposure value of the image (the scene data) based on the event data obtained by pre-capturing the scene. When a pixel is changed in the image generated by capturing the scene, the electronic device 200 may asynchronously receive the event data. The row-wise exposure value according to the event data may be obtained by identifying and determining a change in brightness level in various rows of the scene by changing a critical value of a sensing degree of the sensor 230. The sensing degree of the event sensor may be changed to obtain an event density change connected with illumination of the scene. Thus, an event change in the scene may correspond to a motion change of an object in the scene.

According to an embodiment of the disclosure, the processor 210 may determine a row-wise exposure time when the RGB sensor captures each row, based on a brightness level identified for each row, and may transmit the determined exposure time to the RGB sensor.

The processor 210 may determine motion information of the scene based on the event data and the RGB circuit of the sensor 230 may capture the scene by using a row-wise readout priority order generated based on the obtained event data. The row-wise readout priority order may be generated by identifying a row of the image, in which motion is indicated. According to an embodiment of the disclosure, the processor 210 may identify motions of objects in the scene and may assign a higher readout priority order to an object having more motions.

According to an embodiment of the disclosure, many motions may also denote a large change in an edge of the object in the scene. Thus, when there is almost no change in an edge of an object, or when a region has no motion that is sensed, such as a background area in a scene, a low readout priority order may be assigned to the row of the image. A row-wise readout time may be differently set according to the determined readout priority order. The processor 210 may assign a great readout time when the readout priority order is high and may assign a small readout time when the readout priority order is low. By using this method, unnecessary row-wise readout time may be reduced for a region having a few motions and a low pixel intensity change, and an image may be captured and generated to have minimized skews or no skews with high accuracy.

The electronic device 200 of FIG. 2A includes various components. However, components of the electronic device 200 may not be limited thereto, according to an embodiment of the disclosure. For example, the processor 210 may include a plurality of various processors to perform required functions. Also, the memory 220 may correspond to a plurality of memories included in the electronic device 200, rather than a single memory, wherein all of the plurality of memories may be included in the memory 220.

Figure 2B:
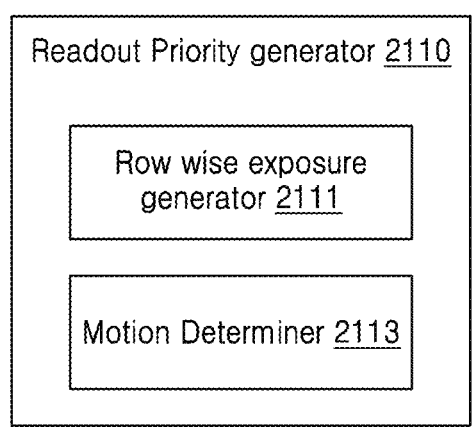
FIG. 2B shows, in detail, a processor according to an embodiment of the disclosure.

FIG. 2B shows in detail the processor 210 according to an embodiment of the disclosure.

According to an embodiment of the disclosure, the processor 210 may be divided into a plurality of modules or units based on functions or may correspond to a single processor performing all functions according to the disclosure.

According to an embodiment of the disclosure, the processor 210 may include a readout priority order generator 2110. The readout priority order generator 2110 may include a row-wise exposure generator 2111 and a motion determiner 2113.

The row-wise exposure generator 2111 may identify a change in brightness level in each row of a scene by changing a threshold value of a sensing degree of the sensor 230. The row-wise exposure generator 2111 may determine and generate an exposure time for each row of the image, when an RGB sensor captures a scene. The motion determiner 2113 may determine motion degrees of objects in the scene in order to determine a row-wise priority order based on a brightness level identified in each row of a captured image of the scene. The readout priority order generator 2110 may assign the row-wise priority order to each row of the image of the scene, according to the determined motion degrees of the objects. The row-wise exposure generator 2111 may determine a row-wise exposure time according to the assigned priority order.

Figure 3A:
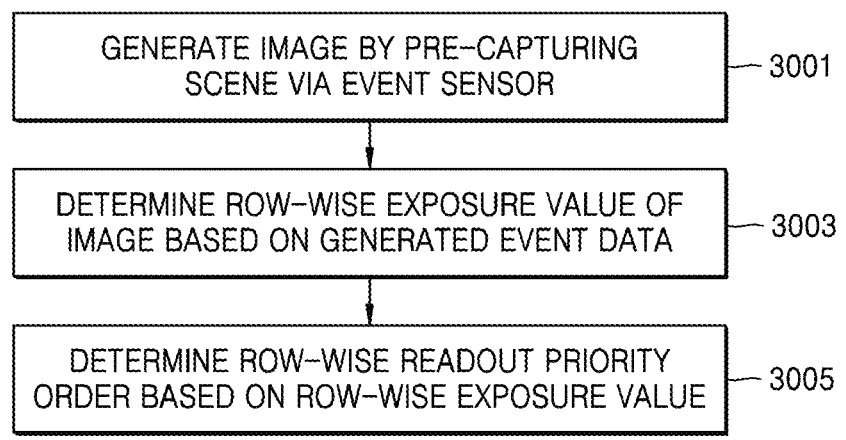
FIG. 3A illustrates a flowchart of a method according to an embodiment of the disclosure.
Figure 3B:
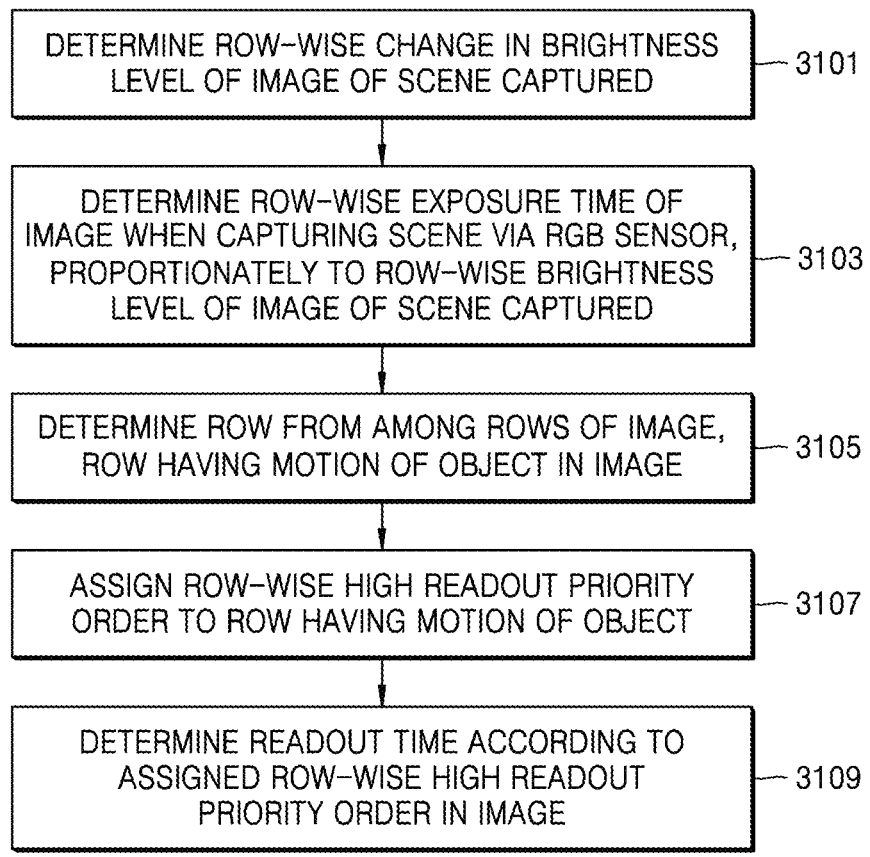
FIG. 3B illustrates a flowchart of a method according to an embodiment of the disclosure.

FIGS. 3A and 3B are flowcharts of a method of capturing a high dynamic range (HDR) image, according to an embodiment of the disclosure.

First, referring to FIG. 3A, the sensor 230 of the electronic device 200, in particular, an event sensor may generate an image by pre-capturing a scene, in operation 3001. Event data may be generated from the image generated by pre-capturing the scene.

In operation 3003, a row-wise exposure value of the image may be determined based on the generated event data. Here, the row-wise exposure value of the image may be used when an RGB sensor captures an RGB frame. According to an embodiment of the disclosure, the row-wise exposure value may be determined by determining a row-wise brightness intensity of the image.

In operation 3005, a row-wise readout priority order of the image may be determined based on the row-wise exposure value. Here, temporal redundancy information may be determined by using the row-wise exposure value, and the determined temporal redundancy information may be reflected to determine a row-wise readout priority order. A method of determining the temporal redundancy information will be described in more detail with reference to FIG. 8. The temporal redundancy information may be simply referred to as redundancy information throughout the description.

Referring to FIG. 3B, FIG. 3B is a flowchart of a method of controlling an exposure time in dynamic image capturing.

In operation 3101, the electronic device 200 may determine a change in brightness level of each row of an image of a scene captured. In operation 3103, an exposure time when capturing the scene by the RGB sensor may be determined for each row of the image of the scene, proportionately to a brightness level corresponding to each row of the image of the captured scene. In operation 3105, a row from among the rows of the image, the row having a motion of an object in the image, may be determined.

In operation 3107, a high readout priority order may be assigned to the row having the motion of the object. In operation 3109, a readout time may be determined according to the row-wise priority order in the image.

Figure 4:
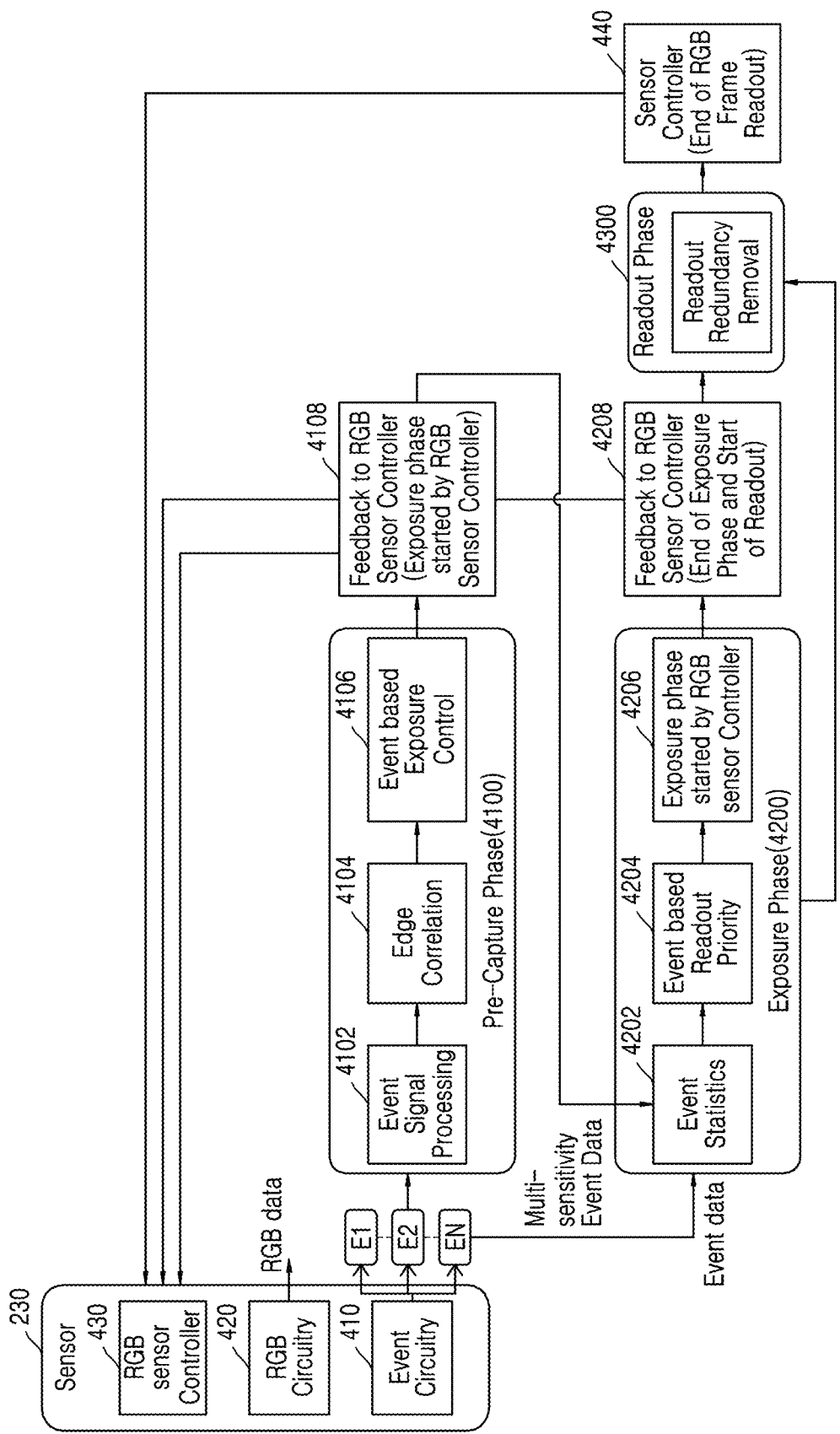
FIG. 4 illustrates a schematic diagram of a method of capturing a high dynamic range (HDR) image, according to an embodiment of the disclosure.

FIG. 4 is a schematic view of a method of capturing an HDR image, according to an embodiment of the disclosure.

Referring to FIG. 4, the sensor 230 may include an event circuit 410, an RGB circuit 420, and an RGB sensor controller 430, according to an embodiment of the disclosure.

According to an embodiment of the disclosure, the method of capturing the HDR image may include a pre-capture phase 4100, an exposure phase 4200, and a readout phase 4300.

In an event signal process phase 4102 in the pre-capture phase 4100, event data generated from a captured scene may be processed to obtain an event map or an event velocity. The event map may be a two-dimensional representation of accumulated event data. Also, the event velocity may denote a change in the event data.

An image of the captured scene may be divided into a plurality of rows. In the plurality of divided rows, a change in brightness level may be identified by changing a threshold value of a sensing degree of an event sensor of the event circuit 410. An exposure time of each row may be determined based on the change in brightness level. Thereafter, an output in the event signal process phase 4102 may be provided to an edge correlation phase 4104. In the edge correlation phase 4101, regions of the image, the regions having a higher change in pixel intensity, may be analyzed. The regions of the image may be related to an edge of an object in the scene. An output in the edge correlation phase 4101 may be provided to an event-based exposure control phase 4106 for generating a row-wise exposure value. In the event-based exposure control phase 4106, an exposure time may be determined for each row, based on the change in pixel intensity (an edge change) in the image, which is the output in the edge correlation phase 4104, and a row-wise exposure value of the image for ultimately obtaining RGB data via the RGB sensor may be generated. The pre-capture phase 4100 may be completed after generating the row-wise exposure value.

After generating the row-wise exposure value, the processor 210 may transmit, as feedback, the row-wise exposure value to the RGB sensor controller 430 of the sensor 230 in operation 4108. The RGB circuit 420 may capture the scene based on the transmitted row-wise exposure value. When the RGB circuit 420 captures the scene, the exposure time may be different between the rows in the image.

Then, the exposure phase 4200 may be performed. In an event statistics phase 4202, motion information of the scene may be determined based on the event data obtained from the event circuit 410 and a row of the image of the scene, in which motion is detected, may be identified. Thereafter, the motion information may be transmitted for an event-based readout priority phase 4204 to generate a row-wise (column-wise) readout priority order.

According to an embodiment of the disclosure, the processor 210 may assign a higher priority order to a row having relatively more motions than a row having relatively less motions. According to another embodiment of the disclosure, the row-wise readout priority order may be generated based on the row-wise exposure value.

After the row-wise readout priority order is generated, the RGB sensor controller 430 may start an exposure phase 4206 with respect to the RGB circuit 420. The processor 210 may provide the row-wise readout priority order to the RGB sensor controller 430 as feedback. Then, the RGB circuit 420 may capture the scene.

According to an embodiment of the disclosure, the processor 210 may perform (readout) redundancy removal in the readout phase 4300. In the readout phase 4300, redundancy information determined for reading-out the captured scene and outputting the scene may be transmitted again to the RGB sensor controller 430. The redundancy information may be temporal redundancy information. The image captured by using this method may have no artifacts.

According to an embodiment of the disclosure, the processor 210 can control to transmit the results of the redundancy removal in the readout phase 4300 to a sensor controller 440. The sensor controller 440 receiving the results of the redundancy removal in the readout phase 4300 constitutes the end of the RGB frame readout.

Figure 5:
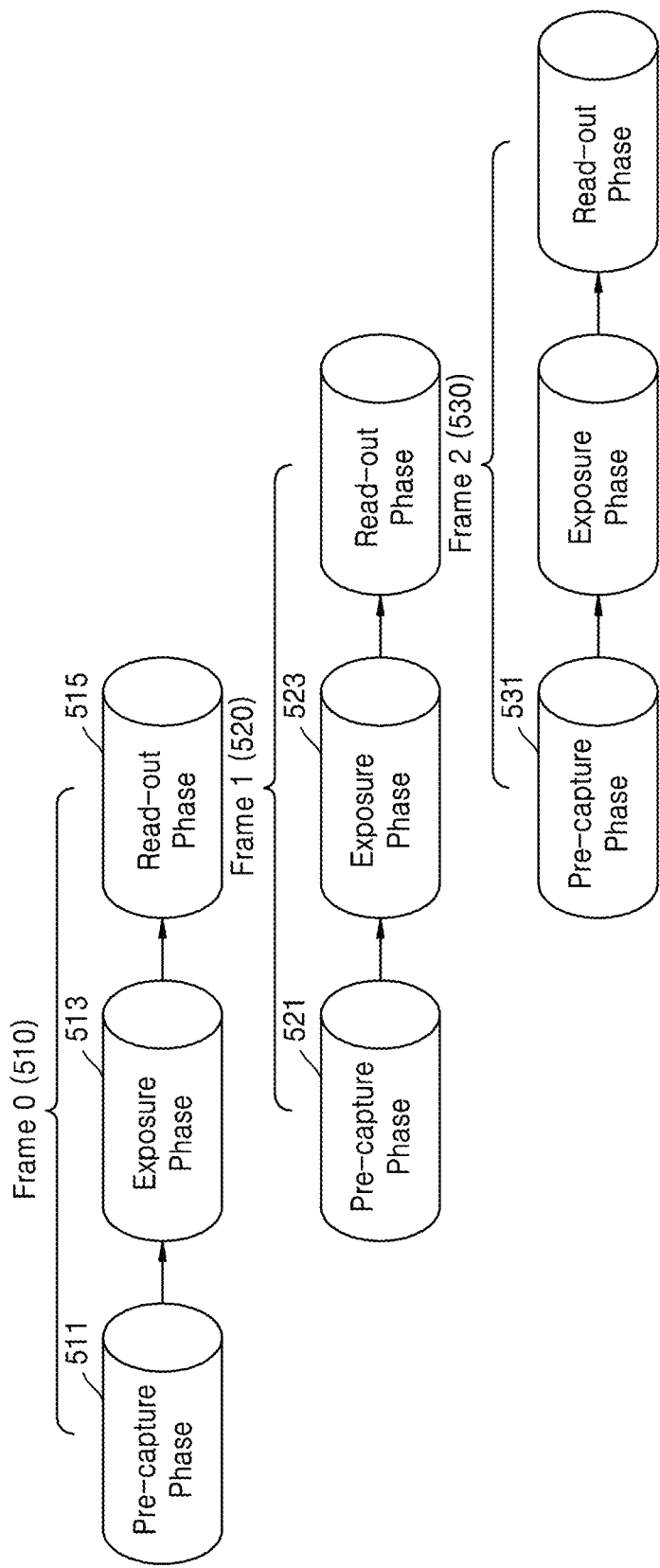
FIG. 5 illustrates a diagram of processing phases with respect to sequential RGB frames, according to an embodiment of the disclosure.

FIG. 5 shows processing phases with respect to sequential RGB frames, according to an embodiment of the disclosure.

Referring to FIG. 5, each of the RGB frames, that is, Frame 0 510, Frame 1 520, or Frame 2 530 may be captured and processed through three phases. As shown in FIG. 4, when an RGB frame is captured, the three phases, the pre-capture phase, the exposure phase, and the read phase, may be undergone.

For example, Frame 0 510 may go through a pre-capture phase 511, an exposure phase 513, and a readout phase 515. An operation of each of the pre-capture phase 511, the exposure phase 513, and the readout phase 515 is described in detail with reference to FIG. 4, and thus, its description will not be repeated.

According to an embodiment of the disclosure, when the pre-capture phase 511 is completed and the exposure phase 513 is started with respect to Frame 0 510, a pre-capture phase 521 may be started in Frame 1 520, in parallel. Then, when the readout phase 515 is started in Frame 0 510, an exposure phase 523 may be started in Frame 1 520 and a pre-capture phase 531 may be started in Frame 2 530 which is a sequential frame. When the frames are sequentially generated based on this method, generating a frame may not take a time corresponding to all three phases, namely, the pre-capture phase, the exposure phase, and the readout phase. Instead, a frame may be generated about a time corresponding to one phase. Thus, a time to generate an RGB frame may be efficiently reduced.

Figure 6A:
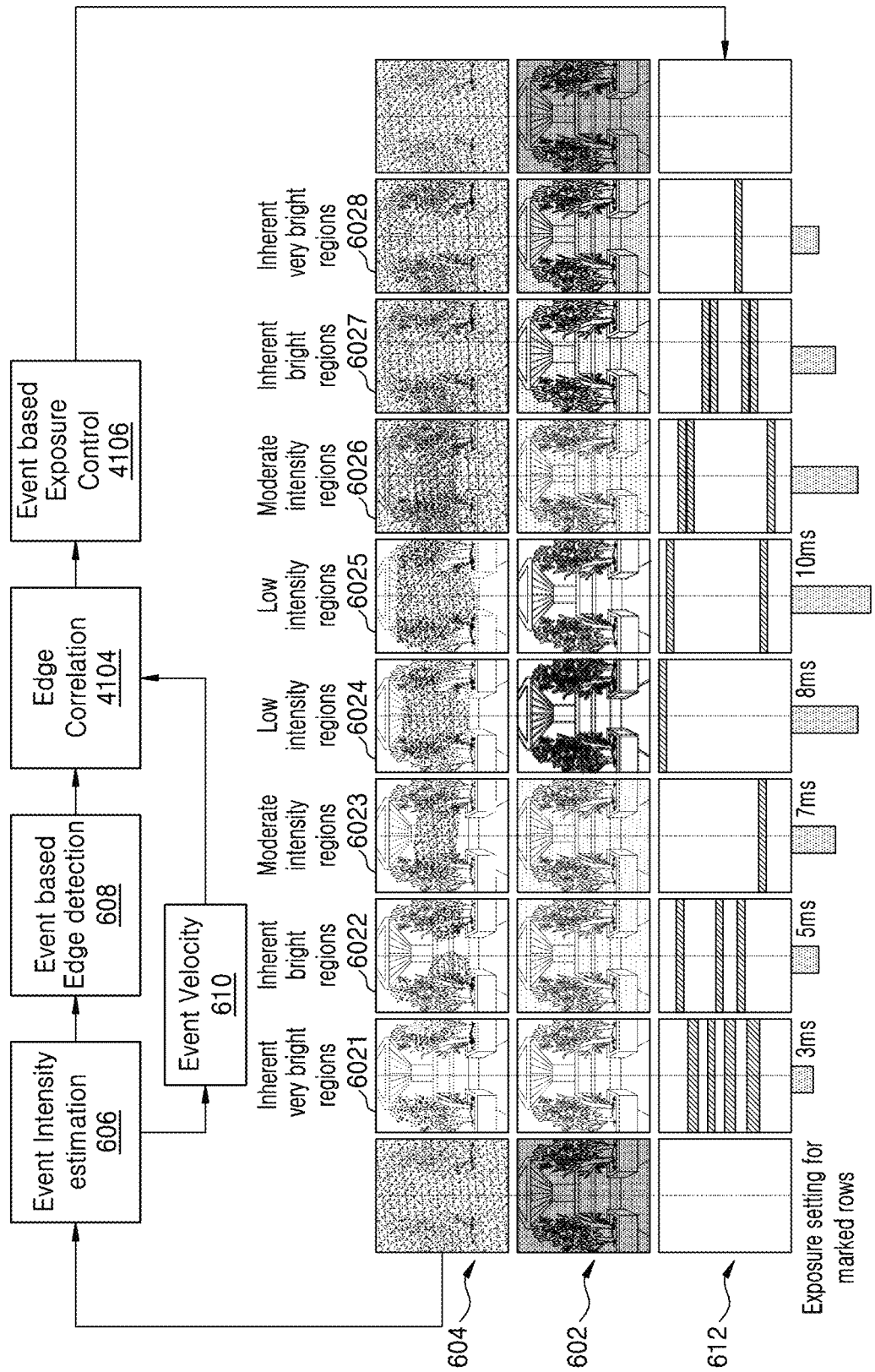
FIG. 6A shows a pre-capture phase according to an embodiment of the disclosure.

FIG. 6A shows a pre-capture phase according to an embodiment of the disclosure.

Referring to FIG. 6A, a row 602 indicates event data in an image that is pre-captured by the electronic device 200. The event data may be obtained by changing the sensitivity of the sensor 230. With reference to an image of the row 602, regions corresponding to row-wise images 612 may be divided into inherent very bright regions 6021 and 6028, inherent bright regions 6022 and 6027, moderate intensity regions 6023 and 6026, a low intensity region 6024, and a lowest intensity region 6025. With reference to the row-wise images 612, a row corresponding to each region is indicated along with an exposure time for each row. For example, with respect to the low intensity region 6024, an exposure time of 8 ms may be included as an exposure value of a corresponding row. With respect to the lowest intensity region 6025, an exposure time of 10 ms may be assigned to a row indicated in the row-wise images 612.

Referring to FIG. 6A, the event data of the row 604 may be input in an event intensity estimation block 606 to determine a row-wise brightness intensity. An output in the event intensity estimation block 606 may be input in an event-based edge detection block 608 and an event velocity block 610. In the event-based edge detection block 608, image regions of a scene including a higher intensity change may be analyzed. Each region may be related to an edge of an object in an image of a scene. In the event velocity block 610, an event map with respect to event data in the scene may be generated and an event velocity may be determined. The event map may be a two-dimensional representation of accumulated event data and the event velocity may denote a change in the event data. According to an embodiment of the disclosure, the event intensity estimation block 606, the event-based edge detection block 608, and the event velocity block 610 may correspond to the phases included in the event signal processing phase 4102 in FIG. 4.

Outputs in the event-based edge detection block 608 and the event velocity block 610 may be input in an edge correlation block 4104. An output from the edge correlation block 4104 may be input in an event-based exposure control block 4106 in order to generate a row-wise exposure value. In the event-based exposure control block 4106, the row-wise exposure value with respect to rows in the image of the scene may be generated based on the determined exposure time and the output of the edge correlation block 4104.

Figure 6B:
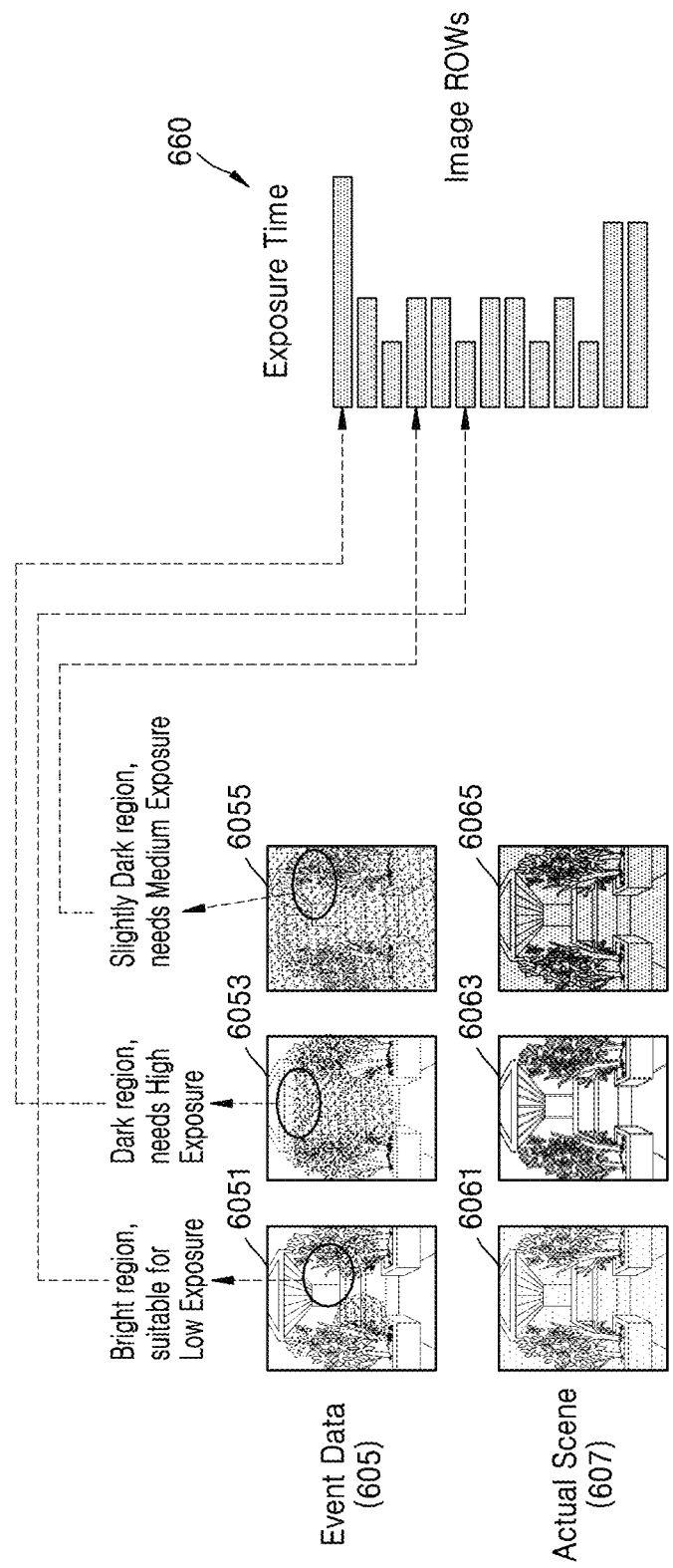
FIG. 6B shows a pre-capture phase according to an embodiment of the disclosure.

FIG. 6B shows a pre-capture phase according to an embodiment of the disclosure.

Event data 605 may correspond to event data with respect to scene images 607. Event data 6051 may correspond to an image 6061. An oval region in event data 6051 may indicate a bright region. Thus, an exposure time graph 660 shows that a short exposure time is assigned to a row corresponding to the oval region.

Event data 6053 shows that an oval region is a dark region, and thus, a long exposure time is assigned to a corresponding row, according to the exposure time graph 660. Event data 6055 shows that a corresponding region is a rather dark area and a moderate exposure time is assigned to a corresponding row, according to exposure time graph 660. Event data 6053 can correspond to an image 6063 and event data 6055 can correspond to an image 6065.

Figure 7A:
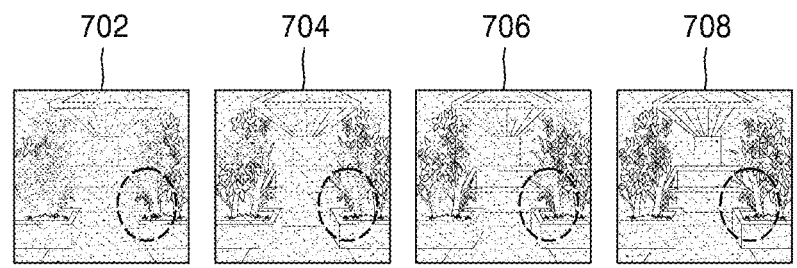
FIG. 7A illustrates an exposure phase according to an embodiment of the disclosure.
Figure 7B:
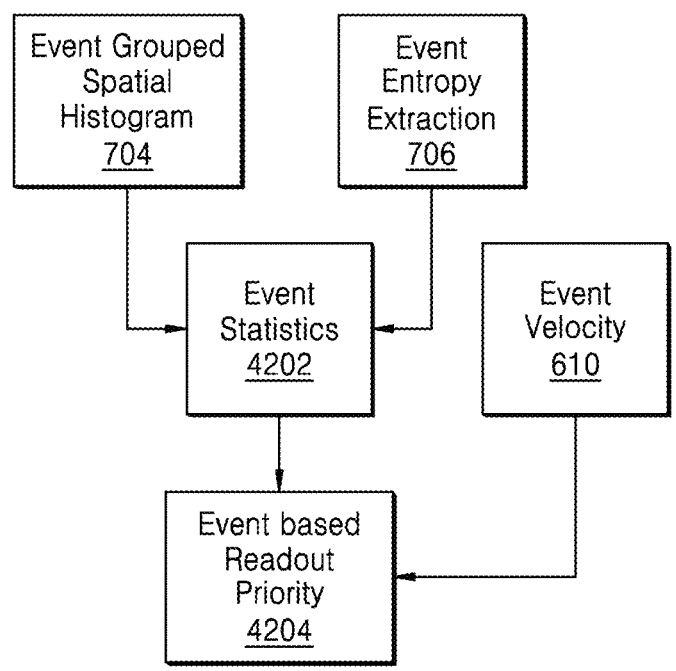
FIG. 7B illustrates an exposure phase according to an embodiment of the disclosure.
Figure 7C:
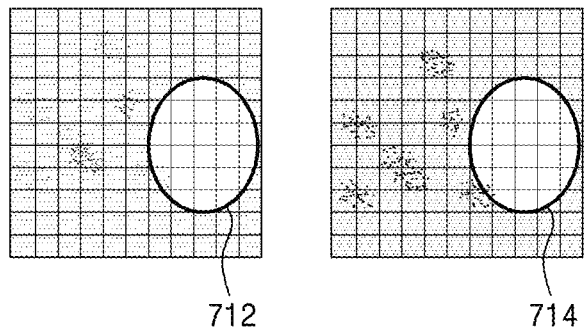
FIG. 7C illustrates an exposure phase according to an embodiment of the disclosure.

FIGS. 7A, 7B, and 7C show an exposure phase according to an embodiment of the disclosure.

FIG. 7A shows event data captured by the event circuit 410 of the sensor 230. As shown in FIG. 7A, the event circuit 410 may generate the event data by capturing a scene when the scene has an inherent change due to motion of an object in an image. Event data 702 through 708 show that regions of an object, the regions including motions, are outlined. The event data may not include color information, and thus, may be quickly captured in a pre-capture phase by using a small amount of data.

FIG. 7B is a flowchart of an exposure phase for determining a readout priority order.

The event data captured by the event circuit 410 may be provided to an event grouped spatial histogram block 704 and an event entropy extraction block 706. The event grouped spatial histogram block 704 may group the event data into smaller blocks according to a basic sensor resolution of the sensor 230, and thus, the event grouped spatial histogram 704 may be used to extract a histogram. The event entropy extraction block 706 may calculate a cost function by using the event data. In the event entropy extraction block 706, a readout priority order of a sensor may be determined together with the event velocity block 610.

Outputs in the event group space histogram block 704 and the event entropy extraction block 706 may be provided to the event statistics phase 4202. In the event statistics phase 4202, motion information of an image of a scene may be determined based on the event data indicating a motion. In the event statistics phase 4202, rows of the image of the scene, the rows indicating or including motions, may be determined. The motion information and the event velocity may be provided to an event-based readout priority order block 4204. In the event-based readout priority order block 4204, a higher readout priority order may be assigned to a row having more motions than a row having less motions.

FIG. 7C shows an image having a motion, in an image of a scene, for determining a readout priority order, according to an embodiment of the disclosure.

As illustrated in FIG. 7C, regions 712 and 714 have many motions in the image of the scene. The regions having more motions are given higher priority orders than other areas having less motions in the image of the scene.

Figure 8:
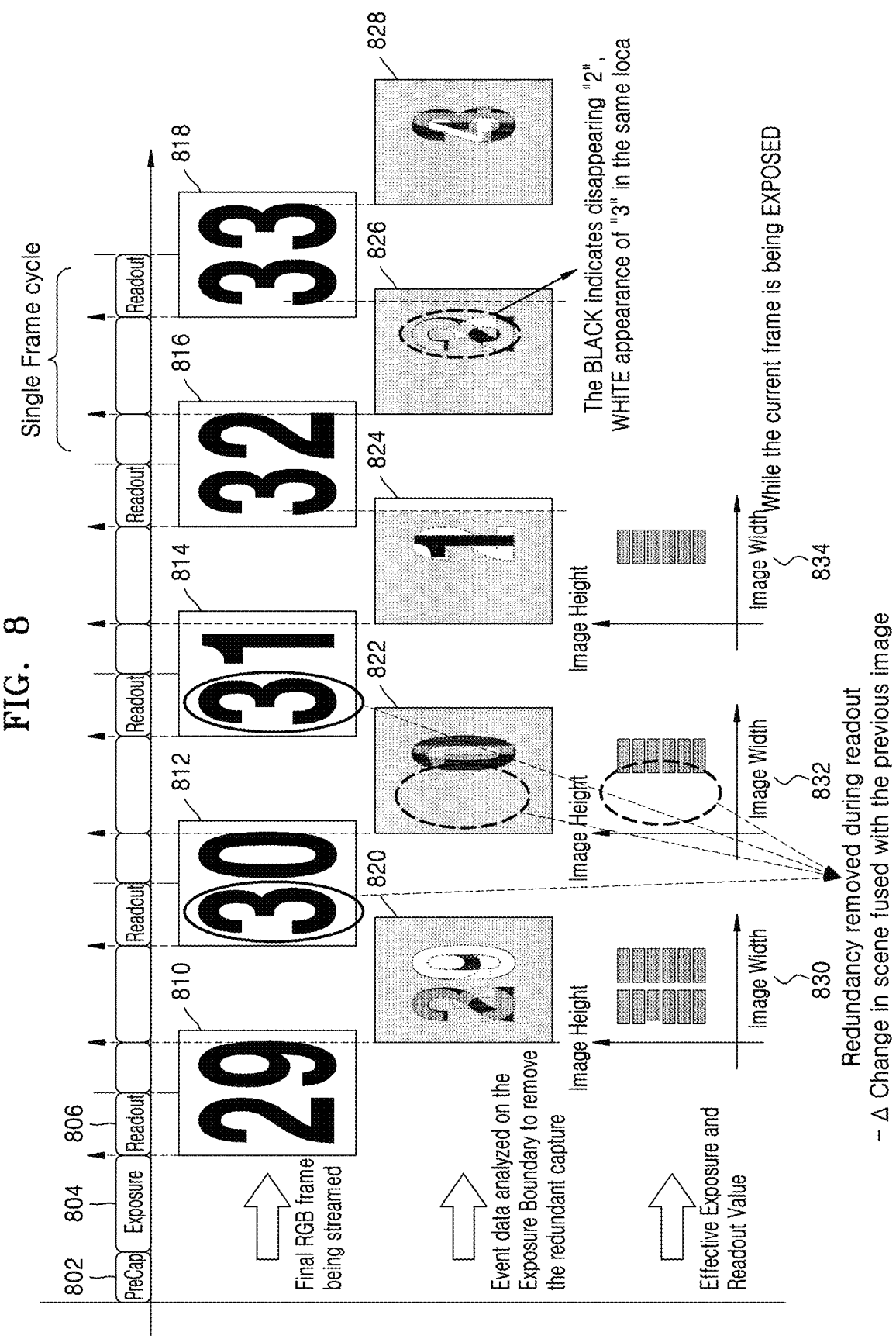
FIG. 8 shows a readout phase according to an embodiment of the disclosure.

FIG. 8 shows a readout phase according to an embodiment of the disclosure.

As shown in FIG. 8, phases 802, 804, and 806 may indicate a pre-capture phase, an exposure phase, and a readout phase for capturing one RGB frame, respectively. In last readout phases, RGB frames 810 through 818 may be finally generated.

Referring to FIG. 8, the RGB frames 810 through 818 may be generated in respective readout phases.

In order to obtain temporal redundancy information, event data 820 through 828 may be analyzed. The event data 820 may indicate event data when the RGB frame 810 is changed to the RGB frame 812. Also, an exposure and readout code graph 830 with respect to the event data 820 is shown. Because a number 29 is changed to a number 30 in an image, a brightness change or a motion occurs at a location of the number, and thus, the event data 820 may identify meaningful event data at the location of the number.

On the contrary, with respect to the event data 822 and 824, a number 3 has no brightness or motion change, and thus, no meaningful event data is identified at the location of the number 3. Likewise, corresponding exposure and readout code graphs 832 and 834 show no necessity for a long exposure time at the location of the number 3.

Like this, when comparing a previous RGB frame corresponding to the number 30 with a sequential RGB frame corresponding to a number 31, a location of the number 3 has temporal redundancy, and thus, it is not required to assign a long exposure time. Thus, the location of the number 3 may not be required to be readout. Thus, redundancy related to the location of the number 3 may be removed. In the RGB frame 812, after the number "30" may be initially read, a number "3" may be continually displayed at the location of the number "3," because the location of the number "3" has no change with reference to the event data in the sequential RGB frames 814, 816, and 818, due to redundancy removal. That is, the exposure and readout graphs 832 and 834 show that the readout of the number "3" is not required to be repeatedly performed after being performed once, because redundancy is moved.

FIGS. 9A, 9B, 9C, and 9D are graphs showing an HDR image according to phases, according to an embodiment of the disclosure.

Figure 9A:
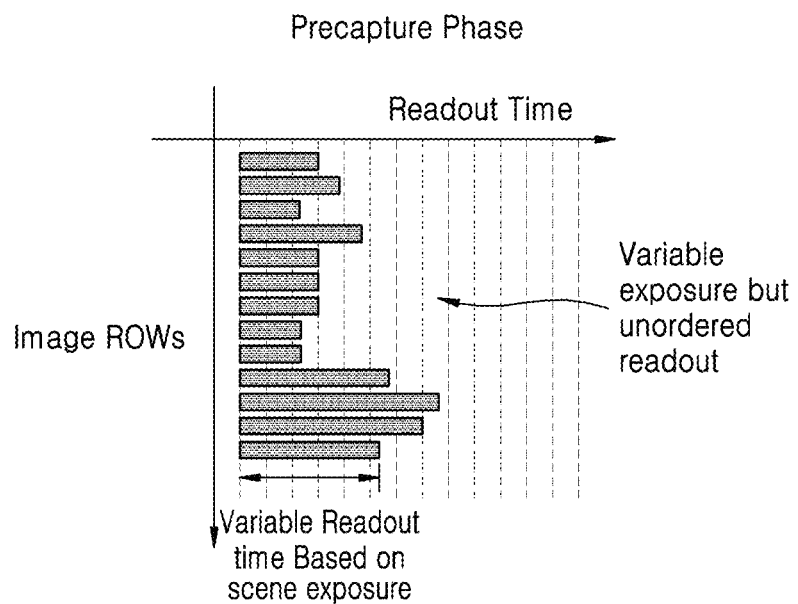
FIG. 9A illustrates a graph of an HDR image according to phases, according to an embodiment of the disclosure.

FIG. 9A shows a pre-capture phase.

In FIG. 9A, a vertical axis indicates a row of an image of a scene that is captured and a horizontal axis indicates a readout time. With reference to FIG. 9A, an exposure time is differently set between rows, according to brightness or a motion in the image of the scene. However, with reference to FIG. 9A, a readout order may not be determined, and thus, FIG. 9A is not suitable to be used for a CMOS image sensor.

Figure 9B:
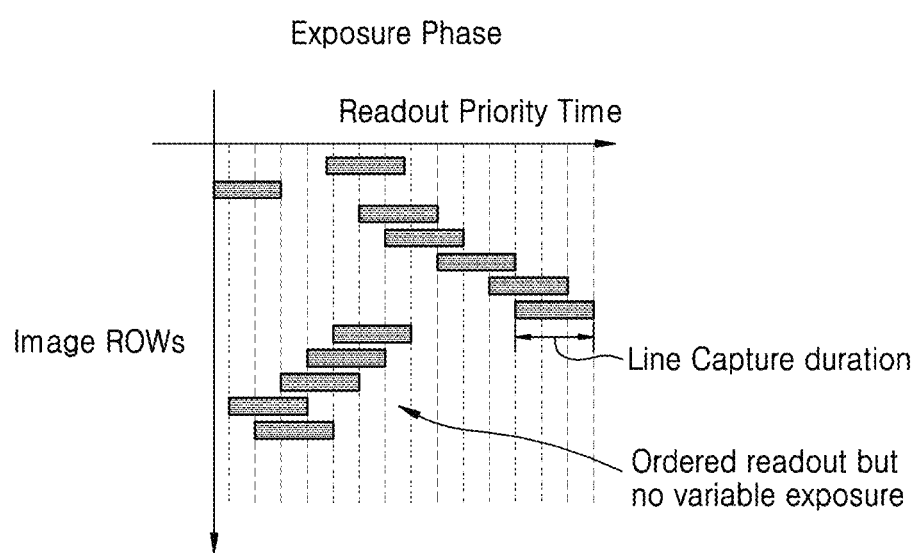
FIG. 9B illustrates a graph of an HDR image according to phases, according to an embodiment of the disclosure.

FIG. 9B shows an exposure phase.

In FIG. 9B, a vertical axis indicates a row of an image of a scene that is captured and a horizontal axis indicates a readout priority order.

With reference to FIG. 9B, the readout order (priority order) is determined for each row in the image in the scene, but an exposure time is constantly set. Thus, it may not be considered that the method according to the disclosure is applied to FIG. 9B, the method setting an optimal exposure time.

Figure 9C:
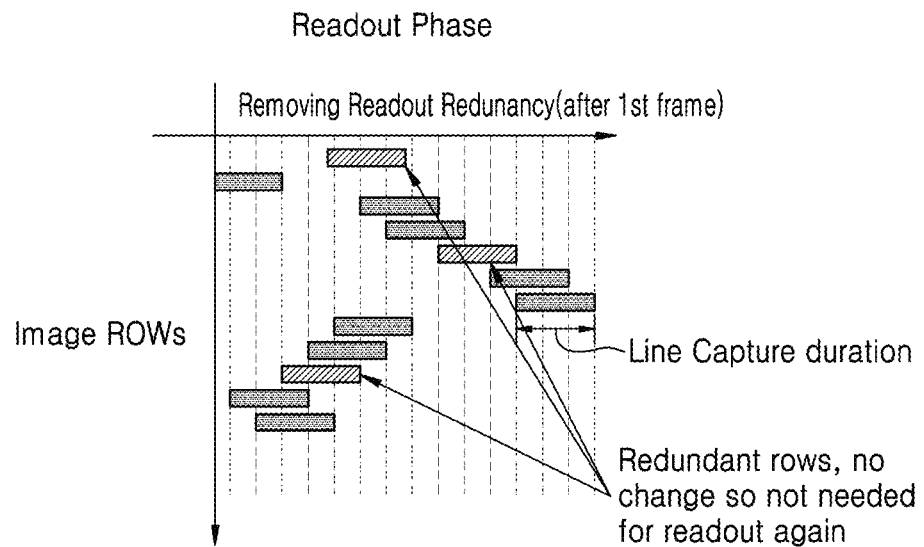
FIG. 9C illustrates a graph of an HDR image according to phases, according to an embodiment of the disclosure.

FIG. 9C shows a readout phase. A graph of FIG. 9C assumes that there is a preceding RGB frame, and thus, a comparison may be performed with the preceding RGB frame to remove temporal redundancy. FIG. 9C shows redundancy rows at three locations.

Figure 9D:
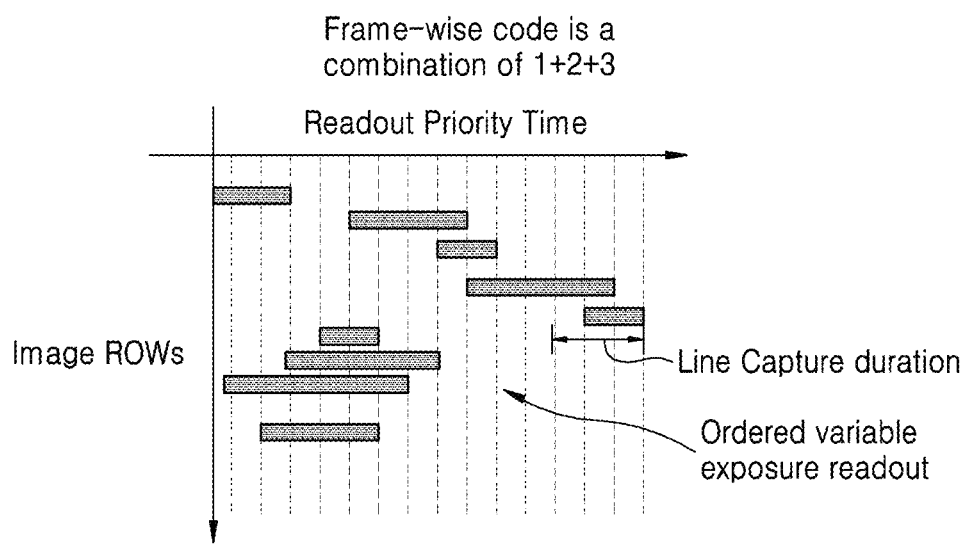
FIG. 9D illustrates a graph of an HDR image according to phases, according to an embodiment of the disclosure.

Finally, FIG. 9D shows an embodiment in which a final row-wise exposure value is applied, in which a readout order is determined, a row not required to be readout is removed according to redundancy, and a different row-wise exposure time is set.

By applying a row-wise readout time in the image of the scene as shown in FIG. 9D, a row not requiring a readout operation may be removed according to temporal redundancy information. Also, by differently setting an exposure value for each row according to event data, a readout time may be optimized, and thus, optimized image capturing by a CMOS rolling shutter may be possible.

Figure 10A:
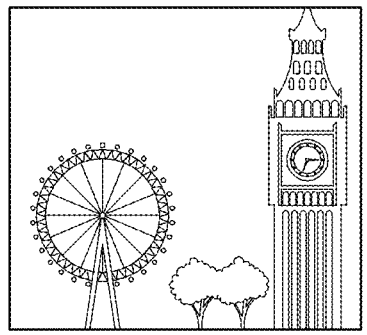
FIG. 10A shows differences in captured images, according to whether or not a dynamic image capturing method, according to an embodiment of the disclosure, is applied.
Figure 10B:
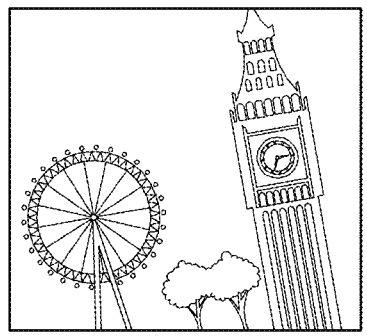
FIG. 10B shows differences in captured images, according to whether or not a dynamic image capturing method, according to an embodiment of the disclosure, is applied.
Figure 10C:
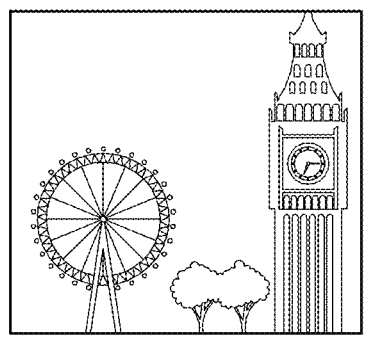
FIG. 10C shows differences in captured images, according to whether or not a dynamic image capturing method, according to an embodiment of the disclosure, is applied.

FIGS. 10A, 10B, and 10C show differences in captured images, according to whether or not a dynamic image capturing method, according to an embodiment of the disclosure, is applied.

FIG. 10A shows an actual scene to be captured and FIG. 10B shows an image captured by using a previous rolling shutter method. As shown in FIG. 10B, when an image is captured by using the previous rolling shutter method, skews may occur in the image. However, in the embodiment shown in FIG. 10C where an image is captured by applying the provided method, skews may not occur and the image may be more temporally-effectively captured.

Embodiments of the disclosure may be realized by at least one software program executed by at least one hardware device and performing a network management function for controlling a component of the hardware device.

The methods according to embodiments of the disclosure may be implemented as program commands which may be executed by various computer means, and recorded on a computer-readable recording medium. The computer-readable recording medium may include program commands, data files, data structures, or a combination thereof. The program commands recorded on the computer-readable recording medium may be specially designed and constructed for the disclosure or may be known to and usable by one of ordinary skill in a field of computer software. Examples of the computer-readable recording medium include magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, random access memories (RAMs), or flash memories). Examples of the program commands include a high-level language code that may be executed by a computer using an interpreter as well as a machine language code made by a complier.

According to the one or more embodiments, according to the dynamic image capturing method and the dynamic image capturing apparatus, motions may be accurately represented in a still image or a video, by using a small amount of calculations for capturing a high speed operation or an image having high speed motions.

Although the present disclosure has been described with various embodiments, various changes and modifications may be suggested to one skilled in the art. It is intended that the present disclosure encompass such changes and modifications as fall within the scope of the appended claims.

What is claimed is:

1. A dynamic image capturing method comprising:
generating a pre-capture image by pre-capturing a scene via an event sensor;
generating event data from the pre-capture image;
determining a row-wise exposure value of the pre-capture image based on the event data;
generating an image by capturing the scene based on the row-wise exposure value;
determining row-wise motion information of the image based on the event data;
identifying at least one row in which a motion is detected; and
determining a row-wise readout priority order of the image based on the row-wise motion information of the image.

2. The method of claim 1, further comprising obtaining red, green, blue (RGB) data by capturing the image based on the row-wise readout priority order of the image.

3. The method of claim 1, wherein the determining of the row-wise readout priority order of the image comprises assigning a high priority order to a row among the at least one row including a high motion degree based on the row-wise motion information.

4. The method of claim 1, wherein the determining of the row-wise exposure value of the image comprises determining a row-wise brightness intensity of the image.

5. The method of claim 1, wherein the generating of the event data from the image comprises extracting a change in an edge of an object in the image.

6. The method of claim 1, wherein the event data from the image comprises an asynchronous change of an intensity of a pixel included in the image.

7. The method of claim 1, wherein the row-wise exposure value is generated based on a row-wise exposure time of the scene.

8. The method of claim 7, further comprising:
assigning a first exposure time to a first row of the image, the first row including a first brightness intensity; and
assigning a second exposure time to a second row of the image, the second row including a second brightness intensity, wherein the first brightness intensity is greater than the second brightness intensity and the first exposure time is shorter than the second exposure time.

9. The method of claim 1, further comprising determining whether a first location in the image has brightness or motion changes based on the event data from the image and event data obtained from a previous red, green, blue, (RGB) frame,
wherein the determining of the row-wise readout priority order of the image comprises determining the row-wise readout priority order of the image by using a determination of whether a location in the image has brightness or motion changes.

10. A dynamic image capturing apparatus comprising:
an event sensor configured to pre-capture a scene; and
a processor configured to:
generate event data from a pre-capture image pre-captured by the event sensor;
determine a row-wise exposure value of the pre-capture image based on the event data;
generate an image by capturing the scene based on the row-wise exposure value;
determine row-wise motion information of the image based on the event data;
identify at least one row in which a motion is detected; and
determine a row-wise readout priority order of the image based on the row-wise motion information of the image.

11. The apparatus of claim 10, further comprising a red, green, blue (RGB) sensor configured to capture the scene to obtain RGB data based on the row-wise readout priority order of the image.

12. The apparatus of claim 10, wherein the processor is further configured to, in order to determine the row-wise readout priority order of the image, assign a high priority order to a row among the at least one row including a high motion degree based on the row-wise motion information.

13. The apparatus of claim 10, wherein the processor is further configured to, in order to determine the row-wise exposure value of the image, determine a row-wise brightness intensity of the image.

14. The apparatus of claim 10, wherein the processor is further configured to, in order to generate the event data from the image, extract a change of an edge of an object in the image.

15. The apparatus of claim 10, wherein the processor is further configured to:
include a first exposure time in the row-wise exposure value based on a row-wise brightness intensity of the image being high; and
include a second exposure time in the row-wise exposure value based on the row-wise brightness intensity of the image being low, wherein the first exposure time is shorter than the second exposure time.

\* \* \* \* \*